(12) United States Patent
Colin et al.

(10) Patent No.: US 11,041,528 B1
(45) Date of Patent: Jun. 22, 2021

(54) PROFILED MAIN BEARING CAPS

(71) Applicant: Cummins Inc., Columbus, IN (US)

(72) Inventors: Julie Anne Colin, Columbus, IN (US); Nathan E. Coulombe, Greenwood, IN (US); David E. Koeberlein, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/737,343

(22) Filed: Jan. 8, 2020

(51) Int. Cl.
*F16C 35/02* (2006.01)
*F16C 33/04* (2006.01)
*F16C 17/02* (2006.01)

(52) U.S. Cl.
CPC ............ *F16C 33/046* (2013.01); *F16C 17/02* (2013.01)

(58) Field of Classification Search
CPC ........ F16C 9/02; F16C 17/022; F16C 33/046; F16C 35/02
See application file for complete search history.

(56) References Cited

U.S. PATENT DOCUMENTS

| | | | |
|---|---|---|---|
| 3,893,734 A | 7/1975 | Ulbrich | |
| 4,209,209 A * | 6/1980 | Stark | F16C 9/02 123/195 S |
| 6,086,258 A * | 7/2000 | Cadle | B22F 5/00 384/273 |
| 6,471,406 B1 * | 10/2002 | Cadle | B22F 5/00 384/433 |
| 8,079,762 B2 | 12/2011 | Romero Fernandez et al. | |
| 9,011,012 B2 | 4/2015 | Hoshikawa et al. | |
| 9,353,787 B2 | 5/2016 | Vincent et al. | |
| 9,670,872 B2 | 6/2017 | Hoshikawa | |
| 2009/0046962 A1 | 2/2009 | Kociba et al. | |
| 2010/0104229 A1 * | 4/2010 | Mandel | F16C 35/02 384/432 |
| 2011/0104229 A1 * | 5/2011 | Stone | A61L 27/365 424/423 |

FOREIGN PATENT DOCUMENTS

| | | |
|---|---|---|
| EP | 1031723 B1 | 6/2005 |
| EP | 1715170 A1 | 10/2006 |
| EP | 2615316 A1 | 7/2013 |
| RU | 2599106 C2 | 10/2016 |

* cited by examiner

*Primary Examiner* — Phillip A Johnson
(74) *Attorney, Agent, or Firm* — Taft Stettinius & Hollister LLP

(57) ABSTRACT

A main bearing cap having a bearing cap body defining a vertical centerline, the bearing cap body having a top surface opposite a bottom surface, a pair of upper protruding parts and a pair of lower protruding parts that extend in a horizontal direction that is orthogonal to a longitudinal axis of a crankshaft, and a pair of posts that extend between the upper and the lower protruding parts. Each of the posts having a profiled side surface that is recessed to a profiled surface depth to reduce contact pressure and fretting between the bottom surface of the bearing cap and a joint surface of a bulkhead of a cylinder block when the parts are assembled. The profiled side surfaces also reduce the stiffness of the bearing cap to match more closely that of the cylinder block and direct load or force towards a centerline of the bearing cap.

20 Claims, 4 Drawing Sheets

PROFILED MAIN BEARING CAPS

GOVERNMENT LICENSE RIGHTS

This Project Agreement Holder (PAH) invention was made with U.S. Government support under Agreement No. W15QKN-14-9-1002 awarded by the U.S. Army Contracting Command-New Jersey (ACC-NJ) Contracting Activity to the National Advanced Mobility Consortium. The Government has certain rights in the invention.

FIELD OF THE INVENTION

The present disclosure relates to a profiled main bearing cap, and more particularly to reducing relative motion between a cylinder block and the profiled main bearing cap.

BACKGROUND

Generally, main bearing caps have a semi-cylindrical arch or notch on an interior face and include holes or orifices that extend through the main bearing caps. These holes or orifices receive fasteners, such as bolts, there-through to assemble the main bearing cap with a cylinder block. The main bearing caps typically also have flat portions that contact flat portions on the cylinder block. The cylinder block such as a bulkhead thereon has a semi-cylindrical shape that is complementary to the arch in the main bearing caps to form a hole to receive a crankshaft therein.

Under engine operating conditions, fretting can occur between the flat ends of the main bearing caps and the cylinder block. Fretting typically refers to wear and sometimes corrosion damage at the asperities of contact surfaces or the flat ends. Although the flat ends of the main bearing caps and the cylinder block are smooth surfaces, sometimes these surfaces are not truly smooth on a microscopic scale. These asperities may be rough, with sharp, rough or rugged projections. Fretting is damage or wear that is induced under load and in the presence of repeated relative surface motion, as induced for example by vibration such as by a crankshaft, or firing loads, or by some other force, between the main bearing caps and the cylinder block. Fretting degrades the surface layer quality of these flat ends to produce increased surface roughness and micropits, which reduces the fatigue strength of the components. Moreover, often the cylinder block and bearing cap have different stiffness properties, that can cause an increase of relative motion between the bearing cap and cylinder block, which also increases fretting.

The contact movement causes mechanical wear and material transfer at the surface of these flat ends of the main bearing cap and cylinder block, often followed by oxidation of both the metallic debris and the freshly exposed metallic surfaces. Because the oxidized debris is usually much harder than the surfaces from which it came, it often acts as an abrasive agent that increases the rate of fretting.

One known technique to address fretting is to add ribs or other stiffening features to the main bearing cap, however these stiffening features can induce uneven or non-uniform pressure distribution on the main bearing cap and cause other problems such as wear and tear on the main bearing cap and main bearings. Another technique to address fretting is to bring the main fasteners closer together on the bearing cap, however, this technique is limited by the geometry and space of the cylinder block, crankshaft and surrounding components. Yet another alternative approach is to increase the load in the main fasteners of the bearing cap, however this approach is limited by the stress induced in the cylinder block and main bearing caps.

Therefore, a need remains for further improvements in apparatus, systems, and methods in this area.

SUMMARY

Beneficially profiled side surfaces of a main bearing cap reduces the stiffness of the bearing cap to match the stiffness of a bulkhead thereby reduces fretting between a bottom surface of the bearing cap and a joint surface of a bulkhead of a cylinder block.

The unique profiled side surfaces of posts of the bearing cap are recessed relative to upper protruding parts and lower protruding parts, to enable redirection of a load path towards a centerline of the bearing cap to more evenly distribute the contact pressure over a bottom surface of the bearing cap that exists when the bearing cap is assembled with the bulkhead. A redirection of the load path through the bearing cap occurs as more material of the bearing cap is removed to form the profiled side surfaces as compared to other known bearing caps that add ribs and stiffening features to increase the amount of material in these areas and increase stiffness. Beneficially, the redirection of the load path also results in a more uniform contact pressure distribution over the bottom surface of the bearing cap such that there is a small difference of magnitude of contact pressure over the bottom surface.

Moreover ribs and other stiffening features on the side surfaces of the bearing cap can cause uneven wear on the bottom surface of the bearing cap. Beneficially with the profiled side surfaces, contact between the bottom surface of the bearing cap and the joint surface of the bulkhead slides relative thereto when the bearing cap is assembled with the bulkhead. As such, contact between the bottom surface and the joint surface of the bulkhead is not over constrained, is not too far such that the bottom surface does not adequately contact the bulkhead, is not too near such that too much contact pressure builds on the bottom surface, or the contact is not sticking between the bottom surface and the joint surface of the bulkhead such that the bearing cap does not move relative to the bulkhead.

Another problem associated with adding material such as ribs and stiffening features on the sides of a bearing cap is fretting or relative sliding motion between the bottom surface of the bearing cap and joint surface of the bulkhead of the cylinder block. Beneficially, with the profiled side surfaces, the fretting or relative sliding motion of the bottom surface of the bearing cap to the joint surface of the bulkhead is decreased relative to other types of bearing caps that include stiffening features. With the profiled side surfaces of the bearing cap, the fretting or relative sliding motion between the bottom surface and the joint surface can be minimized. As such, there is no separation between the bottom surface of the bearing cap and the joint surface of the bulkhead. Beneficially, the profiled side surfaces reduce fretting to an acceptable limit at the joint between the bottom surface and the joint surface on the bulkhead when the bearing cap is fully assembled with the bulkhead. Beneficially the cylinder block does not need modification to receive the bearing cap with profiled side surfaces and will meet the fretting requirements for the bearing cap.

BRIEF DESCRIPTION OF THE DRAWING

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION OF REPRESENTATIVE EMBODIMENTS

Figure 1:
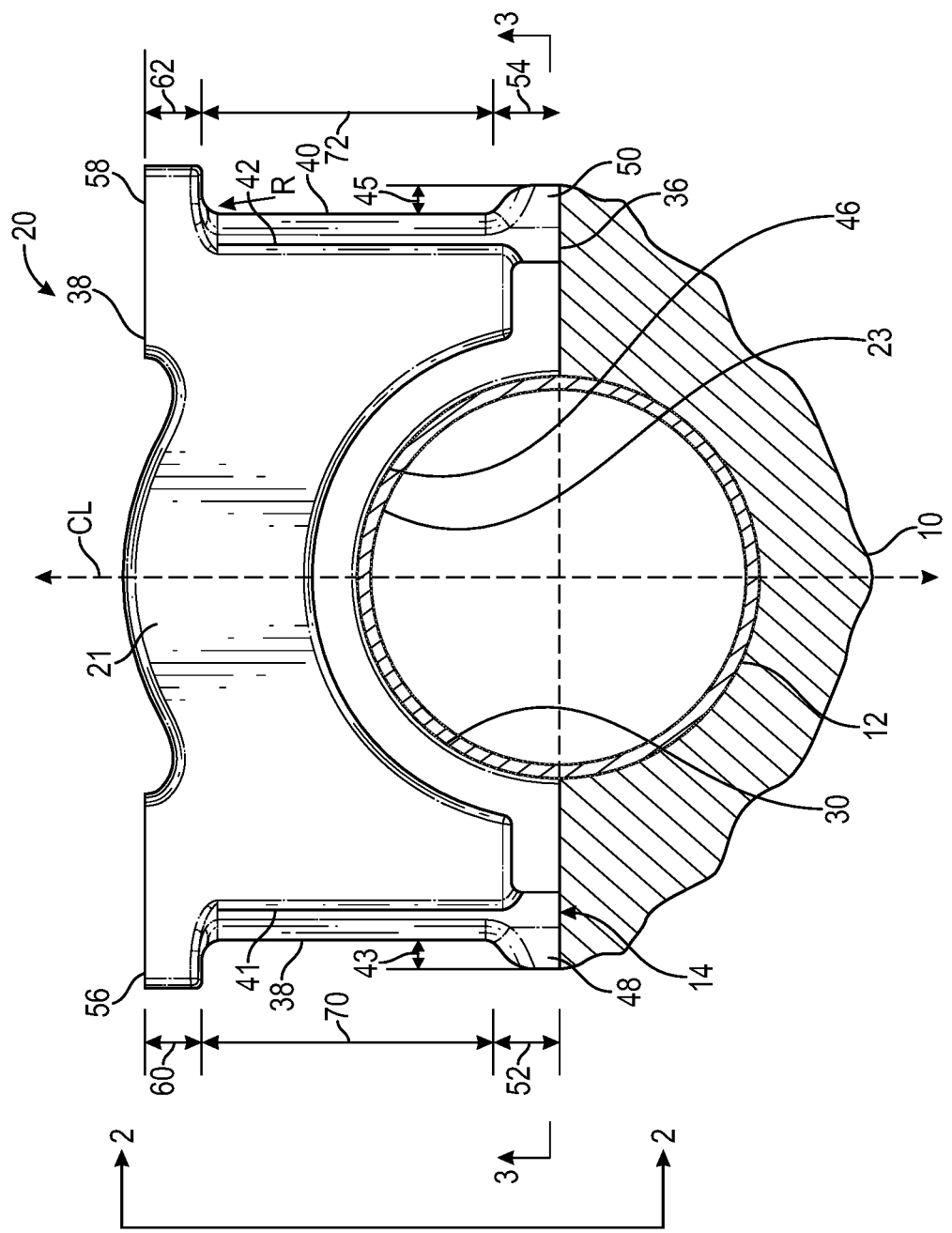
FIG. 1 is a front view of a bearing cap and a partial view of a bulkhead of a cylinder block.
Figure 2:
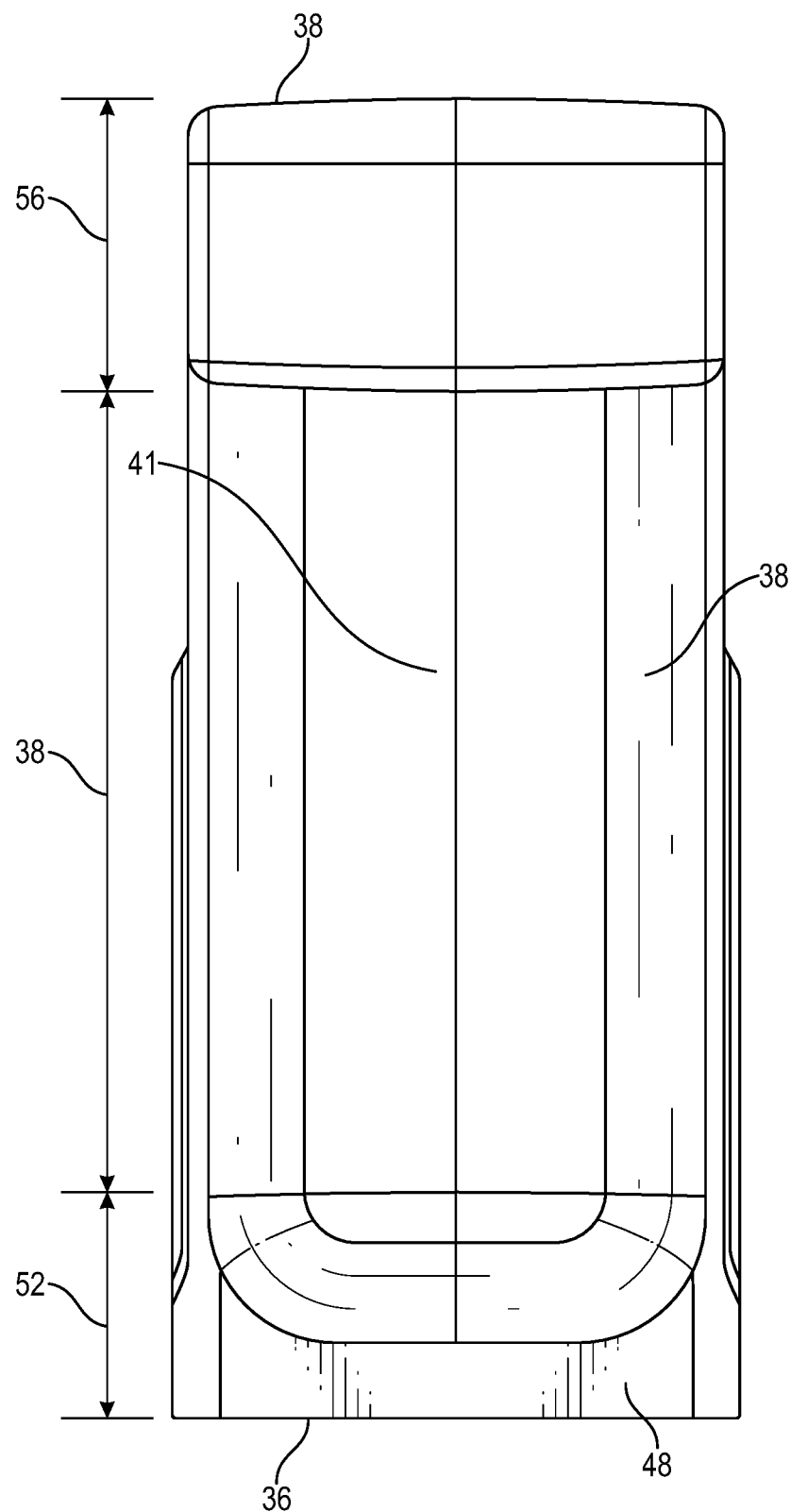
FIG. 2 is a side view of the bearing cap of the FIG. 1 embodiment.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Referring to FIGS. 1, 2, 3, and 4, illustrated is a profiled main bearing cap 20 for assembly with a bulkhead 10 of a cylinder block of an internal combustion engine with bolts or fasteners 22 to form a main bearing cap assembly. The profiled main bearing cap 20 is configured to support a crankshaft of the reciprocating internal combustion engine that comprises a bulkhead 10 of the cylinder block (not illustrated).

The bearing cap 20 has a bearing cap body 21 defining a vertical centerline CL wherein the bearing cap body 21 has a generally rectangular block shape. The bearing cap body 21 has a semi-circular notch 30 that corresponds to a notch 12 formed on the bulkhead 10 that aligns with the semi-circular notch 30 when the bearing cap 20 is assembled with the bulkhead 10 on the cylinder block. In an assembled configuration, the semi-circular notch 30 and the notch 12 in the bulkhead 10 will form a circular bearing hole sized to receive a main bearing insert 23 to provide a bearing surface upon which to receive the crankshaft therein such that the crankshaft can rotate within the main bearing insert 23.

The bearing cap 20 includes bolt insertion holes 32 and 34 that are formed on both sides of the notch 30 through the bearing cap body 21, and corresponding holes are formed in the bulkhead 10 to allow the bolts 22 to be threaded to fix the bearing cap 20 to the bulkhead 10.

The bearing cap body 21 of the bearing cap 20 includes a bottom surface 36 that assembles with the bulkhead 10, a top surface 38 on the opposite side as the bottom surface 36, and a pair of posts 41 and 42 with respective profiled side surfaces 38 and 40 that connect the bottom surface 36 and the top surface 38. The posts 41 and 42 and the profiled side surfaces 38 and 40 extend toward the semi-circular notch 30. Each of the bolts 22 includes a head part 44 that contacts the top surface 38 when the bolts 22 are assembled with the bearing cap 20. The bearing cap 20 includes a half-cylindrical area 46 that forms the semi-circular notch 30.

Figure 3:
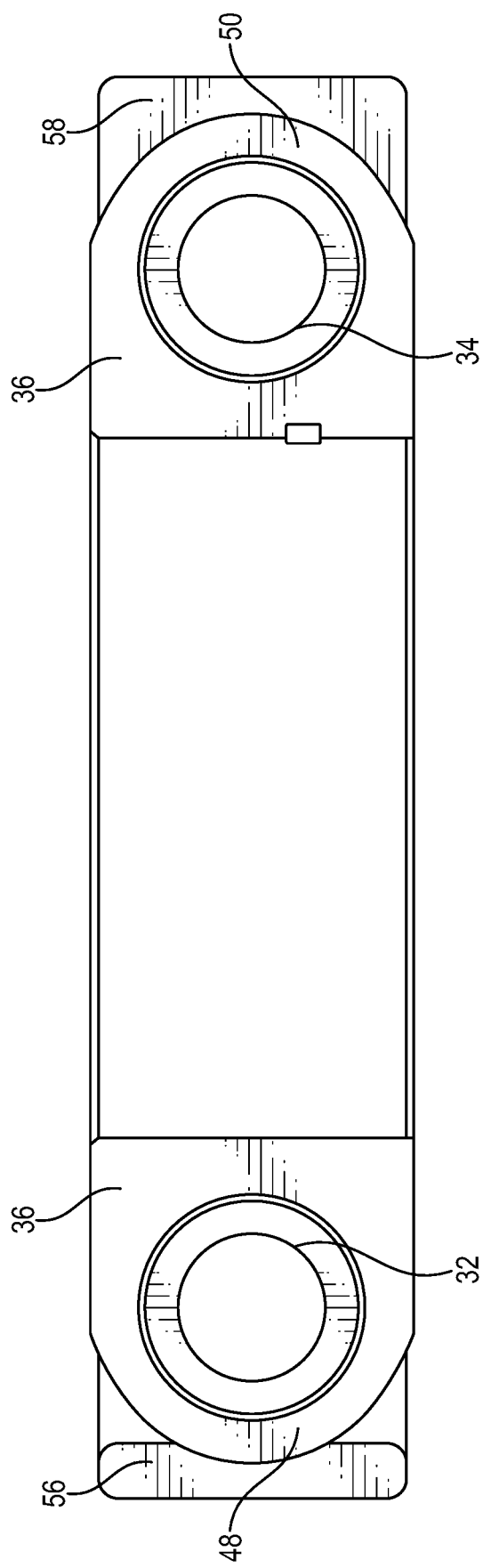
FIG. 3 is a bottom view of the bearing cap of the FIG. 1 embodiment.
Figure 4:
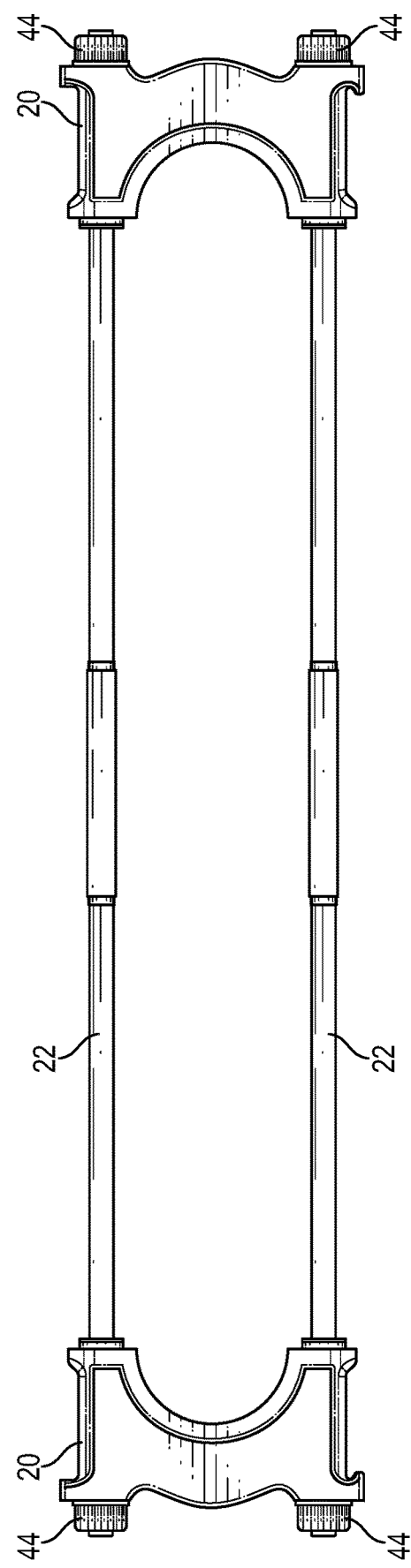
FIG. 4 is a front view of two of the bearing caps from FIG. 1 assembled with fasteners.

The bearing cap 20 includes lower protruding parts 48 and 50 that extend or protrude from the profiled side surfaces 38 and 40 a length that corresponds to a profiled surface depth 43 and 45 in the horizontal direction orthogonal to the crankshaft, or in the right-left direction relative to FIGS. 1 and 3. The lower protruding parts 48 and 50 also extend away from the bottom surface 36 towards the top surface 38, or in a direction along the centerline CL, a length that corresponds to a height 52 and 54 of the lower protruding parts 48 and 50. In the illustrated embodiment, the lower protruding parts 48 and 50 are semi-circular in shape, and extend away from the profiled side surfaces 38 and 40 in the right-left direction relative to FIG. 3, however in other embodiments the lower protruding parts 48 and 50 can have another shape. The lower protruding parts 48 and 50 enlarge the bottom surface 36 however the lower protruding parts 48 and 50 do not extend beyond upper protruding parts 52 and 54 as measured in the right-left direction relative to FIGS. 1 and 3.

The upper protruding parts 56 and 58 extend or protrude from the profiled side surfaces 38 and 40 and also extend beyond lower protruding parts 48 and 50 in the horizontal direction orthogonal to the crankshaft, or in the right-left direction relative to FIGS. 1 and 3. In other forms, the upper protruding parts 56 and 58 do not extend beyond the lower protruding parts 48 and 50 in the right-left direction relative to FIGS. 1 and 3. The upper protruding parts 56 and 58 also extend away from the top surface 38 towards the bottom surface 36, or in a direction along the centerline CL, a length that corresponds to a height 60 and 62 of the upper protruding parts 56 and 58. The upper protruding parts 56 and 58 are rectangular in shape, however in other embodiments the upper protruding parts 56 and 58 can have another shape. The upper protruding parts 56 and 58 enlarge the top surface 38 in the horizontal direction orthogonal to the crankshaft in the right-left direction relative to FIGS. 1 and 3.

The profiled side surfaces 38 and 40 have a length 70 and 72 that spans between the lower protruding parts 48 and 50 and the upper protruding parts 56 and 58. The profiled side surfaces 38 and 40 on posts 41 and 42 recede from the lower protruding parts 48 and 50 and the upper protruding parts 56 and 58 towards the semi-circular notch 30. In the illustrated embodiment, the profiled side surfaces 38 and 40 on posts 41 and 42 are recessed from the lower protruding parts 48 and 50 to reduce the amount of material used to form the bearing cap 20. The profiled side surfaces 38 and 40 are also recessed from the upper protruding parts 56 and 58. The profiled side surfaces 38 and 40 have a semi-circular shape however in other embodiments, the profiled side surfaces 38 and 40 can have a different shape such as rectangular, square, convex, obtuse angle, to name a few. Redirection of the load is achieved through the bearing cap 20 by receding the profiled side surfaces 38 and 40 and posts 41 and 42 away from the lower protruding parts 56 and 58 to thereby reduce the stiffness in that area and force or direct the load or force from operation of the crankshaft towards the center or towards the posts 41 and 42 of the bearing cap 20. By receding the profiled side surfaces 38 and 40 towards the notch 30, reduces the stiffness of the bearing cap 20, and it was discovered to be beneficial to match the stiffness of the bulkhead 10 to thereby reduce fretting between the bottom surface 36 and the joint surface 14 of the bulkhead 10.

Yet another problem associated with placing ribs and stiffening features on the sides of a bearing cap is increased contact pressure between the bottom surface of the bearing cap and a joint surface of a bulkhead. The unique profiled side surfaces 38 and 40 of posts 41 and 42 are recessed relative to the upper protruding parts 56 and 58 and the lower protruding parts 48 and 50, to enable redirection of a load path towards a centerline CL of the bearing cap 20. For example, the load path can be directed through the bottom surface 36 and through the posts 41 and 42 to more evenly distribute the contact pressure over the bottom surface 36 that exists when the bearing cap 20 is assembled with the bulkhead 10. A redirection of the load path through the bearing cap 20 occurs unexpectedly as more material of the bearing cap 20 is removed to form the profiled side surfaces 38 and 40 as compared to other known bearing caps that include ribs and stiffening features. Beneficially, the redirection of the load path also results in a more uniform contact pressure distribution over the bottom surface 36 of the bearing cap 20 such that there is a small difference of magnitude of contact pressure over the bottom surface 36. The structure of the bearing cap 20 is modified to redirect the load path towards the center of the crank bore or the semi-circular notch 30. This redirection of load is achieved by removing material on the posts 41 and 42 to form the profiled side surfaces 38 and 40.

It was discovered that the ribs and stiffening features positioned on the side surfaces of existing bearing caps to increase the strength of the bearing cap, can induce uneven contact pressure distribution at the main bearing insert 23 and crankshaft interface and also cause localized bearing wear at this same interface. Beneficially with the profiled side surfaces 38 and 40, contact between the bottom surface 36 of the bearing cap 20 and the joint surface 14 of the bulkhead 10 slides relative thereto when the bearing cap 20 is assembled with the bulkhead 10. As such, contact between the bottom surface 36 and the joint surface 14 of the bulkhead 10 is not over constrained, is not too far such that the bottom surface 36 does not adequately contact the bulkhead 10, is not too near such that too much contact pressure builds on the bottom surface 36, or the contact is not sticking between the bottom surface 36 and the joint surface 14 of the bulkhead 10 such that the bearing cap 20 does not move relative to the bulkhead 10.

Another problem associated with adding material such as ribs and stiffening features on the sides of a bearing cap is fretting or relative sliding motion between the bottom surface of the bearing cap and joint surface of the bulkhead of the cylinder block. Beneficially, with the profiled side surfaces 38 and 40, the fretting or relative sliding motion of the bottom surface 36 of the bearing cap 20 to the joint surface 14 of the bulkhead 10 is decreased relative to other types of bearing caps that include stiffening features. With the profiled side surfaces 38 and 40 of the bearing cap 20, the fretting or relative sliding motion between the bottom surface 36 and the joint surface 14 can be minimized. As such, there is no separation between the bottom surface 36 of the bearing cap 20 and the joint surface 14 of the bulkhead 10. Beneficially, the profiled side surfaces 38 and 40 reduce fretting to an acceptable limit at the joint between the bottom surface 36 and the joint surface 14 on the bulkhead 10 when the bearing cap 20 is fully assembled with the bulkhead 10. Beneficially the cylinder block does not need modification to receive the bearing cap 20 and will meet the fretting requirements for the bearing cap 20.

The bearing cap 20 constructed with profiled side surfaces 38 and 40 of posts 41 and 42 reduces contact pressure and fretting between the bottom surface 36 of the bearing cap 20 and the joint surface 14 of the bulkhead 10 that is generated by the crankshaft during operation of the internal combustion engine. The profiled side surfaces 38 and 40 also reduce the stiffness of the bearing cap 20 to match a stiffness of the bulkhead 10.

A first aspect of the present disclosure includes a main bearing cap for assembly with a crankshaft and a bulkhead of a cylinder block, the main bearing cap comprising: a bearing cap body defining a vertical centerline; a pair of upper protruding parts that extend in a horizontal direction that is orthogonal to a longitudinal axis of the crankshaft; a pair of lower protruding parts that extend in the horizontal direction that is orthogonal to the longitudinal axis of the crankshaft; and a pair of posts that extend between the upper protruding parts and the lower protruding parts, each of the pair of posts having a profiled side surface wherein the profiled side surfaces are recessed to a profiled surface depth in the horizontal direction that is orthogonal to the longitudinal axis of the crankshaft.

One example of this first aspect includes the profiled side surfaces have a consistent cross-sectional shape along a length thereof.

Another example of this first aspect further comprises a pair of fasteners configured to assemble the main bearing cap with the bulkhead; and wherein the profiled side surfaces are configured to reduce fretting between a bottom surface of the bearing cap body and a joint surface of the bulkhead due to operation of the crankshaft. One example of this example includes the fretting is less than 10 microns.

Yet another example of this first aspect includes the profiled side surfaces are semi-circular in shape.

And yet another example of this first aspect includes the pair of lower protruding parts extend from the profiled side surfaces a length that corresponds to the profiled surface depth of each of the profiled side surfaces in the horizontal direction orthogonal to the crankshaft.

A fifth example of this first aspect includes the pair of upper protruding parts extends further than the pair of lower protruding parts extend as measured from the vertical centerline of the bearing cap body in the horizontal direction orthogonal to the crankshaft.

A sixth example of this first aspect includes a stiffness of the main bearing cap is the same as a stiffness of the bulkhead.

A second aspect of the present disclosure includes a main bearing cap assembly, comprising: a bulkhead of a cylinder block, the bulkhead defining a bulkhead notch; and a main bearing cap having a bearing cap body defining a vertical centerline and a bearing cap notch; a pair of upper protruding parts that extend in a horizontal direction that is orthogonal to a longitudinal axis of a crankshaft; a pair of lower protruding parts that extend in the horizontal direction that is orthogonal to the longitudinal axis of the crankshaft; and a pair of posts that extend between the upper protruding parts and the lower protruding parts, each of the pair of posts having a profiled side surface wherein the profiled side surfaces are recessed to a profiled surface depth in the horizontal direction that is orthogonal to the longitudinal axis of the crankshaft; wherein the main bearing cap is assembled with the bulkhead such that the bearing cap notch is aligned with the bulkhead notch to form a bearing hole.

A first example of this second aspect further comprises a pair of fasteners configured to assemble the main bearing cap with the bulkhead; and wherein the profiled side surfaces are configured to reduce fretting between a bottom surface of the bearing cap body and a joint surface of the bulkhead due to operation of the crankshaft. One example further comprises: a main bearing insert that is positioned in the bearing hole. Another example includes the profiled side surfaces are configured to reduce contact pressure between the bottom surface of the bearing cap body and the joint surface of the bulkhead to an acceptable limit during operation of the crankshaft. Yet another example includes the profiled side surfaces are configured to direct forces towards the centerline of the bearing cap body during operation of the crankshaft.

A second example of this second aspect includes the pair of lower protruding parts extend from the profiled side surfaces a length that corresponds to the profiled surface depth of each of the profiled side surfaces in the horizontal direction orthogonal to the crankshaft.

A third example of this second aspect includes the profiled side surfaces have a consistent cross-sectional shape along a length thereof.

A fourth example of this second aspect includes the pair of upper protruding parts extends further than the pair of lower protruding parts extend as measured from the vertical centerline of the bearing cap body in the horizontal direction orthogonal to the crankshaft.

A fifth example of this second aspect includes the profiled side surfaces are semi-circular in shape.

A sixth example of this second aspect includes a stiffness of the main bearing cap is equal to a stiffness of the bulkhead.

A third aspect of the present disclosure includes a method of assembling a main bearing cap to a cylinder block of an internal combustion engine, comprising: mounting the main bearing cap onto a bulkhead of the cylinder block, the bulkhead defining a bulkhead notch, the bulkhead having a bulkhead stiffness; wherein the main bearing cap has a bearing cap body defining a vertical centerline and a bearing cap notch, the bearing cap body having: a pair of upper and a pair of lower protruding parts that extend in a horizontal direction that is orthogonal to a longitudinal axis of a crankshaft; and a pair of posts that extend between the upper protruding parts and the lower protruding parts, each of the pair of posts having a profiled side surface wherein the profiled side surfaces are recessed to a profiled surface depth in the horizontal direction that is orthogonal to the longitudinal axis of the crankshaft, the profiled surface depth determining a bearing cap stiffness that matches the bulkhead stiffness; aligning the main bearing cap with the bulkhead such that the bearing cap notch and the bulkhead notch form a circular bearing hole; and positioning a main bearing insert into the circular bearing hole.

One example of this third aspect includes each of the pair of posts includes a bolt insertion hole, the bulkhead includes corresponding bulkhead holes; and inserting a pair of fasteners through the bolt insertion holes of the main bearing cap and through the bulkhead holes of the bulkhead.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A main bearing cap for assembly with a crankshaft and a bulkhead of a cylinder block, the main bearing cap comprising:
   a bearing cap body defining a vertical centerline;
   a pair of upper protruding parts that extend in a horizontal direction that is orthogonal to a longitudinal axis of the crankshaft;
   a pair of lower protruding parts that extend in the horizontal direction that is orthogonal to the longitudinal axis of the crankshaft; and
   a pair of posts that extend between the upper protruding parts and the lower protruding parts, each of the posts having a profiled side surface wherein the profiled side surfaces are recessed to a profiled surface depth in the horizontal direction that is orthogonal to the longitudinal axis of the crankshaft, wherein the profiled side surfaces are configured to reduce fretting between a bottom surface of the bearing cap body and a joint surface of the bulkhead due to operation of the crankshaft.

2. The main bearing cap of claim 1, wherein the profiled side surfaces have a consistent cross-sectional shape along a length thereof.

3. The main bearing cap of claim 1, further comprising:
   a pair of fasteners is configured to assemble the main bearing cap with the bulkhead.

4. The main bearing cap of claim 3, wherein the fretting is less than 10 microns.

5. The main bearing cap of claim 1, wherein the profiled side surfaces are semi-circular in shape.

6. The main bearing cap of claim 1, wherein the pair of lower protruding parts extend from the profiled side surfaces at a length that corresponds to the profiled surface depth of each of the profiled side surfaces in the horizontal direction orthogonal to the crankshaft.

7. The main bearing cap of claim 1, wherein the pair of upper protruding parts extends further than the pair of lower protruding parts extend as measured from the vertical centerline of the bearing cap body in the horizontal direction orthogonal to the crankshaft.

8. The main bearing cap of claim 1, wherein a stiffness of the main bearing cap is the same as a stiffness of the bulkhead.

9. A main bearing cap assembly, comprising:
   a bulkhead of a cylinder block, the bulkhead defining a bulkhead notch; and
   a main bearing cap having a bearing cap body defining a vertical centerline and a bearing cap notch, the bearing cap body having:
      a pair of upper protruding parts that extend in a horizontal direction that is orthogonal to a longitudinal axis of a crankshaft;
      a pair of lower protruding parts that extend in the horizontal direction that is orthogonal to the longitudinal axis of the crankshaft; and
      a pair of posts that extend between the upper protruding parts and the lower protruding parts, each of the posts having a profiled side surface wherein the profiled side surfaces are recessed to a profiled surface depth in the horizontal direction that is orthogonal to the longitudinal axis of the crankshaft, wherein the profiled side surfaces are configured to reduce fretting between a bottom surface of the bearing cap body and a joint surface of the bulkhead due to operation of the crankshaft;
   wherein the main bearing cap is assembled with the bulkhead such that the bearing cap notch is aligned with the bulkhead notch to form a bearing hole.

10. The main bearing cap assembly of claim 9, further comprising:
    a pair of fasteners configured to assemble the main bearing cap with the bulkhead.

11. The main bearing cap assembly of claim 10, further comprising:
    a main bearing insert that is positioned in the bearing hole.

12. The main bearing cap assembly of claim 10, wherein the profiled side surfaces are configured to reduce contact pressure between the bottom surface of the bearing cap body and the joint surface of the bulkhead during operation of the crankshaft.

13. The main bearing cap assembly of claim 10, wherein the profiled side surfaces are configured to direct forces towards the centerline of the bearing cap body during operation of the crankshaft.

14. The main bearing cap assembly of claim 9, wherein the pair of lower protruding parts extend from the profiled side surfaces a length that corresponds to the profiled surface depth of each of the profiled side surfaces in the horizontal direction orthogonal to the crankshaft.

15. The main bearing cap assembly of claim 9, wherein the profiled side surfaces have a consistent cross-sectional shape along a length thereof.

16. The main bearing cap assembly of claim 9, wherein the pair of upper protruding parts extends further than the pair of lower protruding parts extend as measured from the vertical centerline of the bearing cap body in the horizontal direction orthogonal to the crankshaft.

17. The main bearing cap assembly of claim 9, wherein the profiled side surfaces are semi-circular in shape.

18. The main bearing cap assembly of claim 9, wherein a stiffness of the main bearing cap is equal to a stiffness of the bulkhead.

19. A method of assembling a main bearing cap to a cylinder block of an internal combustion engine, comprising:
mounting the main bearing cap onto a bulkhead of the cylinder block, the bulkhead defining a bulkhead notch, the bulkhead having a bulkhead stiffness;
wherein the main bearing cap has a bearing cap body defining a vertical centerline and a bearing cap notch, the bearing cap body having:
a pair of upper and a pair of lower protruding parts that extend in a horizontal direction that is orthogonal to a longitudinal axis of a crankshaft; and
a pair of posts that extend between the upper protruding parts and the lower protruding parts, each of the posts having a profiled side surface wherein the profiled side surfaces are recessed to a profiled surface depth in the horizontal direction that is orthogonal to the longitudinal axis of the crankshaft, the profiled surface depth determining a bearing cap stiffness that matches the bulkhead stiffness;
aligning the main bearing cap with the bulkhead such that the bearing cap notch and the bulkhead notch form a circular bearing hole; and
positioning a main bearing insert into the circular bearing hole.

20. The method of claim 19, wherein each of the posts includes a bolt insertion hole, the bulkhead includes corresponding bulkhead holes; and inserting a pair of fasteners through the bolt insertion holes of the main bearing cap and through the bulkhead holes of the bulkhead.

\* \* \* \* \*